United States Patent [19]
Decanini

[11] Patent Number: 5,305,971
[45] Date of Patent: Apr. 26, 1994

[54] SPACECRAFT CONTROL BY ELECTROCHROMIC DEVICES

[75] Inventor: Jorge H. Decanini, Long Beach, Calif.

[73] Assignee: TRW Inc., Redondo Beach, Calif.

[21] Appl. No.: 913,106

[22] Filed: Jul. 14, 1992

[51] Int. Cl.$^5$ ............................................. B64G 1/24
[52] U.S. Cl. ................................. 244/168; 244/173; 136/292
[58] Field of Search ............... 244/168, 173; 136/292

[56] References Cited

U.S. PATENT DOCUMENTS

| | | | |
|---|---|---|---|
| 3,057,579 | 10/1962 | Cutler et al. | 244/168 |
| 4,728,878 | 3/1988 | Anthony | 244/173 |
| 5,139,578 | 8/1992 | Valley | 136/292 |

FOREIGN PATENT DOCUMENTS 3146701  7/1983  Fed. Rep. of Germany ...... 244/173

Primary Examiner—Michael S. Huppert
Assistant Examiner—Anne E. Bidwell
Attorney, Agent, or Firm—Sol L. Goldstein

[57] ABSTRACT

Electrochromic devices are applied to selected areas on a spacecraft. Radiant energy characteristics of the electrochromic devices are altered by applying appropriate electrical excitation signals to the devices to create a force on the spacecraft due to light impinging on the devices sufficient to alter the orientation thereof or maintain it under the action of external disturbance forces or torques.

14 Claims, 3 Drawing Sheets

SPACECRAFT CONTROL BY ELECTROCHROMIC DEVICES

BACKGROUND OF THE INVENTION

1. Technical Field

This invention relates to spacecraft control and, more particularly, to the use of electrochromic devices to control the maneuvering of a spacecraft.

2. Discussion

A difficult problem confronting a spacecraft is that of controlling and stabilizing the orientation of the spacecraft for long periods of time. If the resultant of the solar radiation forces acting on the spacecraft does not pass through the center of mass of the vehicle, a torque that either perturbs the attitude of the vehicle or causes corrective actions by the attitude control system is produced. The result of these attitude corrections is either consumption of propellant or an increment in the momentum stored in attitude control devices such as momentum/reaction wheels or control moment gyros.

In most space projects, solar radiation pressure is still considered primarily as an environmental disturbance source. As early as 1958, solar pressure was also identified as a source of controllable forces applicable to propulsion and attitude control of spacecraft in long duration missions. For example, it has been proposed to provide a trailing cone system to derive control torques from solar radiation. Weathervane-type movable surfaces to develop controllable torques have also been explored. Other researchers have proposed a reflector-collector configuration for using focused radiation, a system of body-fixed corner mirror arrays for pointing the spin axis of a satellite to the sun, and solar paddles for attitude and spin control. Still others considered using a grated solar sail for controlling the attitude of a spinning, sun-orbiting spacecraft. Other approaches considered the application of solar pressure torquing to earth pointing satellites. For example, one approach considered the case of a gravity-gradient-controlled satellite where torques are produced by translation of the control surfaces. In other cases, rotatable control surfaces were used to control the attitude of a dual spin satellite. Time-optimal control of the attitude of a satellite via solar radiation pressure has also been discussed in the literature.

Solar pressure control has been used in various space missions of the past. Mechanically controlled solar vanes were used in the early Mariner spacecraft. Fixed vanes were flown in the OTS satellite and are baselined in several European and future domestic communication satellites for momentum management.

Current techniques for solar pressure trimming, or attitude control by solar pressure, still generally use either a set of fixed, offset panels or electromechanically controlled vanes. These panels or vanes are usually located at the outer ends of the solar arrays or other appendages to maximize the torques attainable. Since the fixed panels must be of relatively large sizes, and placed at large inclination angles with respect to the arrays, provisions for deployment must be made. Deployment facilities add complexity, weight and cost. Movable vanes can be smaller but require hinges or bearings, actuators, and position transducers or sensors.

Therefore, there is a need for an approach to solar pressure trimming and control that is simple, easy to integrate, without moving parts, and has low cost and weight.

SUMMARY OF THE INVENTION

In accordance with the teachings of the present invention, devices are employed for attitude control based on solar pressure modulation. The devices use electrochromic materials whose radiant energy characteristics, namely, their light transmission, absorption, and reflection characteristics change by application of electric potentials. The devices are preferably configured as small, rectangular thin sheets, and designed for installation in arrays of any desired shape or size. Installation of these solar pressure control devices on the solar array panels of a spacecraft is a simple process with minimal integration impact and low weight and cost penalties.

BRIEF DESCRIPTION OF THE DRAWINGS

The various advantages of the present invention will become apparent to those skilled in the art after studying the following specification and by reference to the drawings in which.

DESCRIPTION OF THE PREFERRED EMBODIMENT

Spacecraft attitude or momentum control of this invention uses electrochromic devices to produce torques by regulating the solar pressure forces acting on various parts of the space vehicle. Electrochromic materials have the property of changing their radiant energy absorption, reflection, or scattering characteristics by application of an electrical excitation (e.g., AC or DC voltage or current). Since these devices can be configured as thin, narrow strips or rectangular sheets, they can be easily installed on structural, or non-active elements of the solar arrays, antennas, or other spacecraft surfaces or appendages. Since the devices are passive thin films or sheets, weight and system integration impacts are minimal.

Electrochromic ("smart window") materials are currently used in displays and instrumentation and for radiant (visual and thermal) energy control in vehicles and buildings. Typically, these materials are either liquid-crystal-based thin sheets or products, available as coatings or thin sheets, in which the mechanism underlying the optical change is the insertion of ions into the electrochromic substance and the subsequent extraction of these same ions. The latter devices may have open circuit memory in the sense of requiring the application of an electric voltage only when it is desired to change the optical properties.

Electrochromic devices can be configured by design to sustain the following state transitions (by application of electrical energy):

Type 1—Transparent to opaque, absorbing

Type 2—Transparent to opaque, reflecting

Type 3—Opaque, absorbing, to opaque, reflecting

Figure 4:
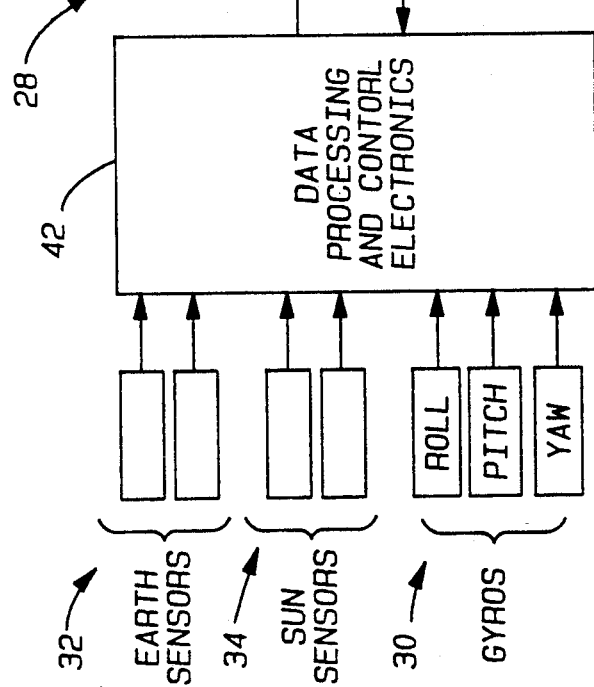
FIG. 4 is a cross-sectional view of a typical electrochromic device taken along the lines 4—4 of FIG. 2.

Examples of suitable electrochromic devices are described in C. M. Lampert and C. G. Granqvist, "Introduction to Chromogenics," SPIE Institute Series, v. IS 4; R. B. Goldner and R. D. Rauh, "Electrochromic Materials for controlled Radiant Energy Transfer in Buildings," Proc. of the SPIE Conf. on Optical Materials and Process Technology for Energy Efficiency and Solar Applications, C. M. Lampert, ed., Aug. 23-25, 1983, San Diego, Calif.; C. M. Lampert, "Innovative Solar Optical Materials," Optical Engineering, v. 23, n. 1, Jan/Feb 1984; and R. B. Goldner, T. E. Haas et al., "Thin Film Solid State Ionic Materials for Electrochromic Smart Window Glass," Solid State Ionics, 28-30 (1988) pp. 1715-1721, North-Holland, Amsterdam. All of the aforementioned publications are incorporated herein by reference. As shown in FIG. 4, these materials are typically thin sheets consisting of two transparent conducting layers 42,44 sandwiching an electrochromic layer (EC) 46 and a counterelectrode layer 48 which are separated by an ion-conducting (IC) layer 50. Typically, the three internal layers produce reversible electrolytic reactions that change the light-transmitting tungsten oxide of the EC into a light-reflecting tungsten bronze.

The attitude control forces (and torques) attainable with electrochromic devices depend on the areas and locations of the devices, on the types and optical characteristics of the materials used, and on the levels of electrical excitation applied to the individual actuators. For equal areas, locations, and excitation levels, maximum forces and torques will be provided by materials of type 2, which transition from transparent to reflecting.

Reflection modulation is the preferred technique for locations where light transmission is not possible due to spacecraft interference. This function is provided by materials of type 3, or type 1 if used with a reflective backing. At locations where the spacecraft does not prevent light transmission, devices of type 2 are the most efficient.

Active solar pressure control using electrochromic devices can provide significant technical and programmatic advantages to future space missions. By managing the momentum inputs due to unbalanced solar pressure, the momentum storage and dumping requirements for attitude control will significantly diminish. This implies smaller momentum or reaction wheels with consequent weight and cost savings. Also, reaction control requirements will be lowered.

The low cost and weight and potentially high reliability characteristics of modern electrochromic devices make them particularly attractive for communication satellites and other long duration missions in earth synchronous orbits.

Figure 1:
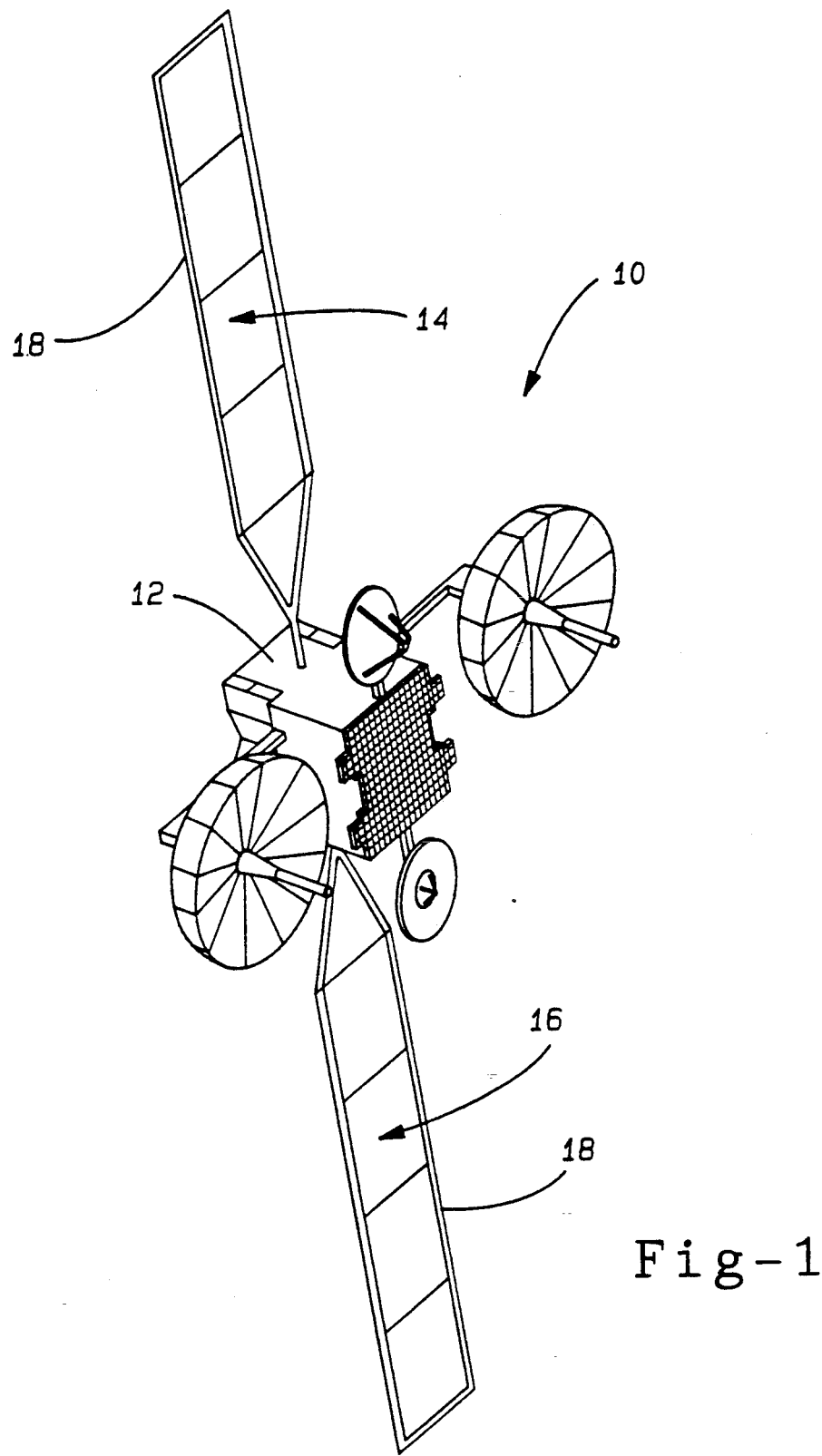
FIG. 1 is a perspective view of a spacecraft wherein electrochromic devices are integrated along the edges of solar array panels of a spacecraft.
Figure 2:
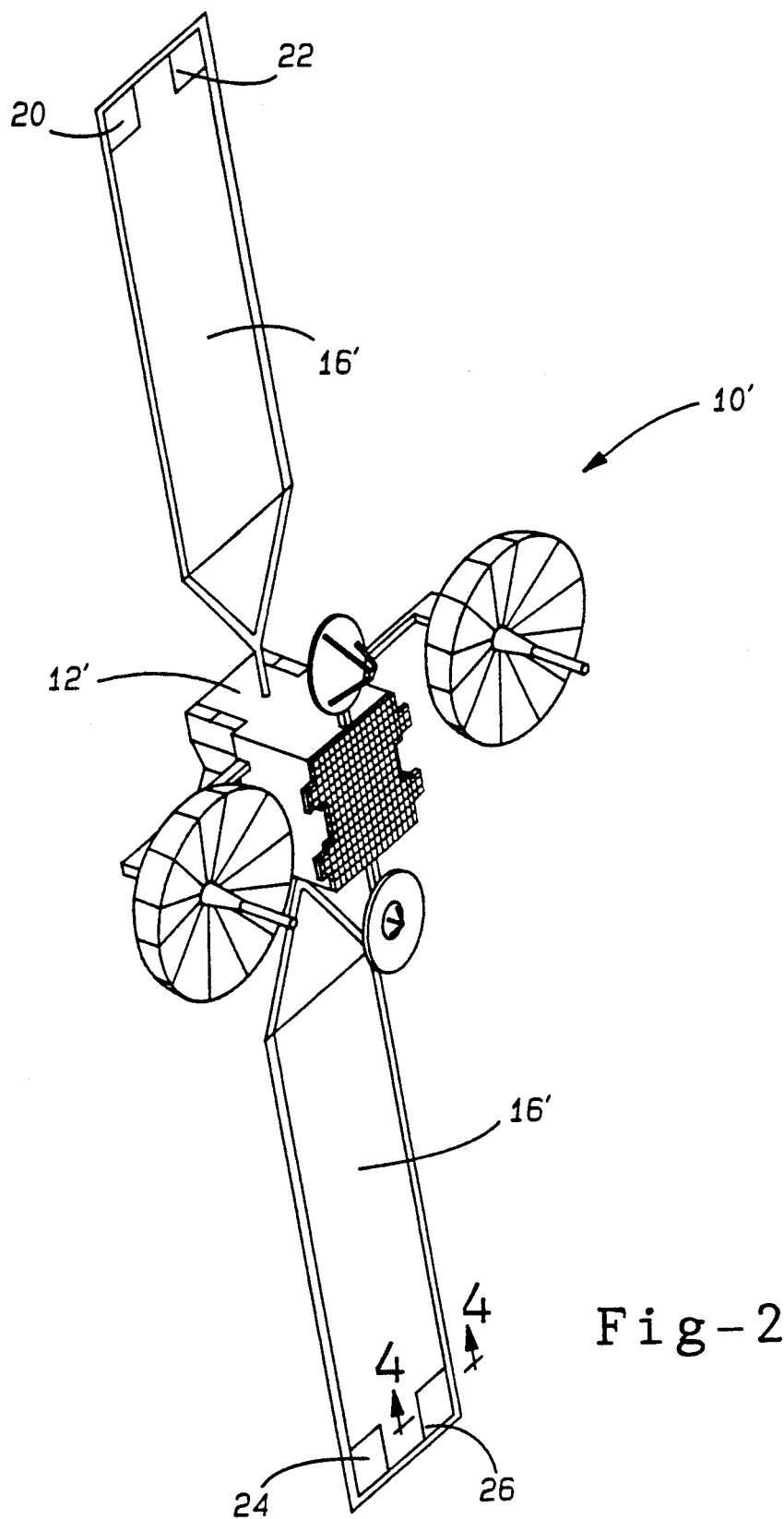
FIG. 2 is a schematic drawing wherein electrochromic devices are integrated on the corners of solar array panels of a spacecraft.

FIG. 1 represents the geometry of a typical spacecraft 10 for earth orbit operation. The control body 12 contains the mission payloads and subsystems for support functions such as propulsion, communications, power conditioning and distribution, and attitude control. The solar panels 14, 16 contain arrays of silicon solar cells for generating electric power. For a communications satellite 10 as shown in FIG. 1, with a 1-inch strip of electrochromic materials 18 on the perimeters of the solar array panels 16 transitioning from opaque to reflecting, the momentum unloading capability will be 0.15 ft-lb-sec per hour. For larger solar pressure control areas and transitions from fully transparent to fully reflecting, the momentum unloading capability can be significantly larger as shown in FIG. 2. Arrays of electrochromic devices 20, 22, 24 and 26 are installed at the outer corners of the solar panels 16' for maximizing the moment arms relative to the spacecraft's center of mass. Materials of type 2, (transparent to reflecting) are used since there are no obstructions to light transmission in these locations.

Assuming normal solar incidence on the solar panels 16', and orientations of the array planes relative to the central body 12' as shown in FIG. 2, pitch torques will be produced when the radiant energy characteristics of electrochromic panels 20 and 24 are equal but different to those of panels 22 and 26, which are also equal. Similarly, roll torques will be produced when the transmission characteristics of the pairs (20, 22) and (24, 26) are equal but different from pair to pair. To get yaw torques about the yaw axis (or sun vector), the pairs (20, 26) and (22, 24) are controlled differentially and, in addition, the planes of the solar panels are offset slightly so that a windmill effect takes place. The transparencies and reflectances of the electrochromic panels are individually controlled by application of electrical voltages. Preferably, this is accomplished by adjusting the timings or duty cycles of the electrical excitations applied to the electrochromic devices.

When the electrochromic devices are initially in a transparent state, the photons of the light rays generally pass through the electrochromic device having negligible impact upon the orientation of the spacecraft. However, upon the application of electrical excitation, the transparent devices transform to an opaque (absorbing) state since they become darker in color. When photons of the light rays impact the dark electrochromic device, the photons do not pass through the device but rather are absorbed. The absorption of the photons creates a force and, consequently generates a torque upon the spacecraft to help offset long-term external torques applied to the spacecraft. These external torques are mostly due to unbalanced solar pressure, gravity gradient, and interactions with the earth's magnetic field. External torques produce two types of momentum accumulation: cyclical and secular. Since the cyclical momentum is periodic, it grows and decays as the spacecraft moves in its orbit, but the net accumulation per orbit is zero. The secular momentum grows continuously without bound.

Because they are bounded, the effects of cyclical and internal torques can be handled conveniently by reaction wheels. Unfortunately, reaction wheels alone cannot work with secular torques because they would drive them to their maximum speed limits. The solution is to use momentum unloading to maintain the wheels within their operating speed limits. Unloading consists in applying torques to the spacecraft, by means of either thrusters or other auxiliary torquing devices, in a direction that will cause the wheel speeds to decay. Thrusters are used mostly for orbit position control and for attitude maneuvers at relatively high rates. Other devices providing lower torque levels are more desirable because unloading firings disturb the spacecraft's attitude if the torques exceed the capabilities of the reaction wheels.

Figure 3:
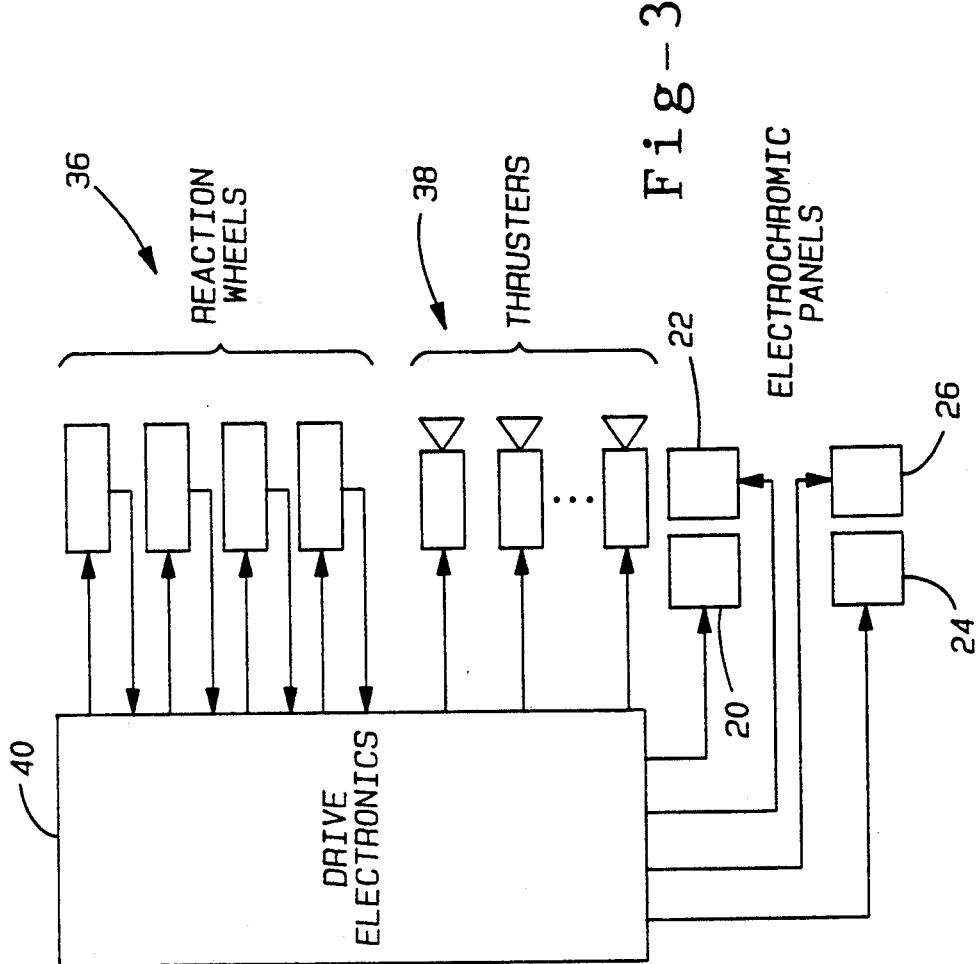
FIG. 3 is a schematic drawing of an Attitude Control System using electrochromic devices, gyros, sensors and thrusters to offset torques being applied to the spacecraft.

FIG. 3 shows a typical attitude control system 28 for a spacecraft in geosynchronous orbit where the electrochromic devices are used for momentum unloading. The attitude of the spacecraft is determined by a set of gyros 30 updated by earth sensors 32. The sun sensors 34 are used to point the solar arrays 16' at the sun. Torques for attitude control in the normal mode of spacecraft operation are provided by reaction wheels 36. Four instead of three wheels are used to provide an additional degree of freedom for speed control. The thrusters 38 are used for controlling the position of the satellite in orbit and for high speed attitude control during propulsion. The electrochromic devices are used for wheel momentum unloading. Drivers for the wheel motors and thruster coils and circuits to control the electrochromic panels are included in the drive electronics 40. The data processing and control electronics 42 conditions sensor signals and performs the arithmetic and input/output functions required by the attitude control algorithms implemented in its computer.

The various advantages of the present invention will become apparent to those skilled in the art after a study of the foregoing specification and following claims.

What is claimed is:

1. A method for altering the orientation of a spacecraft during flight, said method comprising:
   securing at lease one electrochromic device onto at least one surface of the spacecraft; and
   applying electrical excitation to the electrochromic device to cause a change in its radiant energy characteristics to create a controllable variable force on the spacecraft due to light impinging on the device sufficient to alter the orientation thereof.

2. The method of claim 1 wherein the spacecraft includes solar panels extending from a main body thereof; and
   wherein the electrochromic device is secured to selected areas of the solar panels.

3. The method of claim 2 wherein a plurality of electrochromic devices are secured to corners of the solar panels.

4. The method of claim 2 wherein the spacecraft includes a pair of solar panels extending from a main body thereof, and
   wherein strips of electrochromic devices are secured to peripheral edges of the solar panels.

5. The method of claim 1 which further comprises:
   adjusting duty cycles of the electrical excitation applied to the electrochromic device to alter its radiant energy characteristic thereby achieving a desired torque on the spacecraft.

6. The method of claim 1 wherein the spacecraft includes solar panels disposed on the body thereof in a predetermined arrangement, with the method further comprising the steps of:
   affixing a first electrochromic device on one corner of one of the solar panels;
   affixing a second electrochromic device on another corner of said one solar panel;
   affixing a third electrochromic device on one corner of the other solar panel;
   affixing a fourth electrochromic device on another corner of said other solar panel; and
   varying the electrical excitations to the electrochromic devices to selectively change their respective radiant energy characteristics to affect the orientation of the spacecraft about its multiple axes.

7. The method of claim 6 wherein the spacecraft has pitch, roll and yaw axes, and wherein the method further comprises:
   applying electrical excitation signals to the electrochromic devices to establish the same radiant energy characteristics for the first and third devices which are different from the radiant energy characteristics of the second and fourth devices thereby generating a torque on the spacecraft about the pitch axis;
   applying electrical excitation signals to the electrochromic devices to establish the same radiant energy characteristics for the first and second electrochromic devices which are different from the radiant energy characteristics of the third and fourth electrochromic devices thereby generating a torque on the spacecraft about the roll axis; and
   applying electrical excitation signals to the electrochromic devices to generate the same radiant energy characteristics for the first and fourth electrochromic devices which are different from the radiant energy characteristics of the second and third electrochromic devices, while offsetting the planes of the solar panels to create a windmill effect, thereby providing a torque on the spacecraft about the yaw axis.

8. Apparatus for altering the orientation of a spacecraft during flight, said apparatus comprising:
   at least one electrochromic device secured to at least one surface of the spacecraft; and
   drive means for applying electrical excitation to the electrochromic device to cause a change in its radiant energy characteristics to create a controlled variable force on the spacecraft due to light impinging on the device sufficient to alter the orientation thereof.

9. The apparatus of claim 8 wherein the spacecraft includes solar panels extending from a main body thereof; and
   wherein the electrochromic device is secured to selected areas of the solar panels.

10. The apparatus of claim 9 wherein a plurality of electrochromic devices are secured to corners of the solar panels.

11. The apparatus of claim 8 wherein the spacecraft includes a pair of solar panels extending from a main body thereof, and
    wherein strips of electrochromic devices are secured to peripheral edges of the solar panels.

12. The apparatus of claim 8 wherein the drive means adjusts the duty cycles of the electric excitation applied to the electrochromic device to alter its radiant energy characteristic thereby achieving a desired torque on the spacecraft.

13. The apparatus of claim 8 wherein the spacecraft includes solar panels disposed on the body thereof in a predetermined arrangement, with the apparatus further comprising:
    a first electrochromic device on one corner of one of the solar panels;
    a second electrochromic device on another corner of said one solar panel;
    a third electrochromic device on one corner of the other solar panel;
    a fourth electrochromic device on another corner of said other solar panel; and
    wherein said drive means applies different electrical excitations to the electrochromic devices to selectively change their respective radiant energy characteristics to affect the orientation of the spacecraft about its multiple axes.

14. The apparatus of claim 13 wherein the spacecraft has pitch, roll and yaw axes, and wherein the drive means:

applies electrical excitation signals to the electrochromic devices to establish the same radiant energy characteristics for the first and third devices which are different from the radiant energy characteristics of the second and fourth devices thereby generating a torque on the spacecraft about the pitch axis;

applies electrical excitation signals to the electrochromic devices to establish the same radiant energy characteristics for the first and second electrochromic devices which are different from the radiant energy characteristics of the third and fourth electrochromic devices thereby generating a torque on the spacecraft about the roll axis; and applies electrical excitation signals to the electrochromic devices to establish the same radiant energy characteristics for the first and fourth electrochromic devices which are different from the radiant energy characteristics of the second and third electrochromic devices to generate a torque on the spacecraft about the yaw axis.

* * * * *